UNITED STATES PATENT OFFICE.

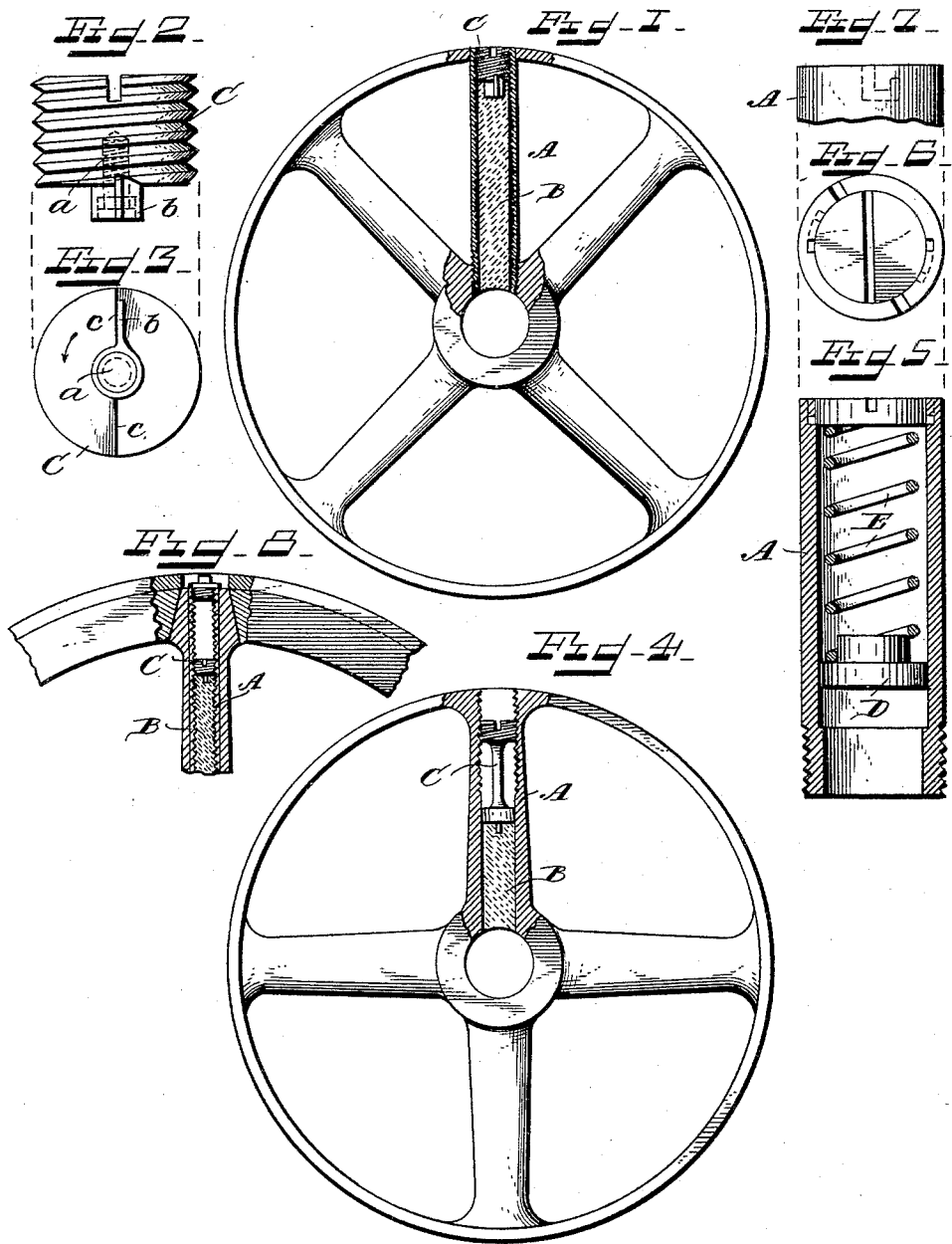

EDMUND LUNKENHEIMER, OF CINCINNATI, OHIO, ASSIGNOR TO THE LUNKENHEIMER BRASS MANUFACTURING COMPANY, OF SAME PLACE.

LOOSE-PULLEY LUBRICATOR.

SPECIFICATION forming part of Letters Patent No. 453,014, dated May 26, 1891.

Application filed December 4, 1890. Serial No. 373,605. (No model.)

*To all whom it may concern:*

Be it known that I, EDMUND LUNKENHEIMER, a citizen of the United States, residing at Cincinnati, in the county of Hamilton and State of Ohio, have invented certain new and useful Improvements in Lubricating Devices for Loose Pulleys and Wheels, of which the following is a description, reference being had to the accompanying drawings, forming part of this specification.

My invention consists in the novel lubricating device itself as a new article of manufacture, and also in a novel combination of it with a pulley or wheel. While applicable to various sorts of wheels, it is chiefly designed for what are known as, "loose-pulleys." Its novelty will be hereinafter set forth and particularly pointed out in the claims.

In the accompanying drawings, Figure 1 represents a side elevation of a pulley having my improved lubricating device applied thereto, the receptacle for the lubricant being shown in section. Fig. 2 is an enlarged detail in side elevation of the plug-follower shown in the receptacle in Fig. 1. Fig. 3 is a bottom plan view of the same. Fig. 4 is a side elevation of a pulley-showing the lubricant-receptacle formed in one of the arms or spokes of the pulley, with a modified form of the follower. Fig. 5 is an enlarged sectional view of a modified form of the detachable lubricating device. Fig. 6 is a top plan view of the device shown in Fig. 5. Fig. 7 is a detail showing in dotted lines the bayonet-lock by which the outer plug or cap in Figs. 5 and 6 is secured in the receptacle. Fig. 8 represents the application of my invention to a vehicle-wheel.

The same letters of reference are used to indicate identical parts in all the figures.

My improved lubricating device (shown in Fig. 1) consists of a tubular receptacle A, adapted to receive and hold a stick of solid lubricant B, such as the well-known grease candles. It is applied to the pulley by inserting it through a hole formed in the rim of the pulley and is secured in place by having its lower exteriorly-threaded end screwed into an interiorly-threaded hole extending radially through the hub of the pulley. The tube A is preferably of such length that when it has been screwed in position its outer end will extend through the rim of the pulley and be flush with the face thereof, while its inner end will extend through the hub of the pulley nearly to the surface of the shaft-opening therein, though it is not essential that the tube be of such length. The interior of the tube is screw-threaded nearly its entire length, and its bore is substantially the same in size throughout its length, so that the grease candle may be freely inserted into and snugly fit it from end to end. In the outer end of the tube is an exteriorly-threaded plug or follower C, adapted to bear against the outer end of the candle and press its inner end against the shaft In putting the device into use the plug is unscrewed, a nick for a screw-driver being provided in its upper side and removed from the tube. The grease candle is then inserted in the tube and the plug replaced and screwed inward until the inner end of the candle is forced firmly against the shaft. As the lubricant is gradually used up, the plug is given an inward turn with a screw-driver from time to time to cause it to follow up the candle and keep it pressed against the shaft. When the plug from these repeated turnings has reached the bottom of the tube and the candle is all used up, the plug is turned in the reverse direction and removed from the tube, a new candle inserted, and the plug replaced and screwed in as before. In this manner the bearing-surfaces are kept thoroughly lubricated, the lubricant is completely utilized, and the greatest possible amount of lubrication is obtained from a given quantity of lubricant.

For the purpose of preventing the plug from getting loose and to insure its retention at the point to which it is turned and the consequent constant pressure of the candle against the shaft, I have provided means by which the plug may turn forward as it is screwed into the tube without turning the candle with it, but by which it is prevented from turning backward without turning the candle with it. As the latter fits snugly in the tube and is pressed tightly against the shaft, it will not turn readily, so that backward movement and loosening of the plug from any jarring or motion of the pulley is effectually prevented. To the under side of the plug is pivoted upon a screw or stud $a$ a vertical plate $b$, Figs. 2 and 3. This plate becomes embedded in the end of the candle when the plug is screwed inward against the latter and will not turn without turning the candle with it. The under side of the plug is provided with one or more cam projections, in this instance two oppositely-facing shoulders $c$ $c$, formed by inclining the two halves of the under surface of the plug in opposite directions, as shown in Fig. 3. The plug turns in the direction of the arrow as it is screwed inward in the tube, and it will be seen that the plate $b$ will ride freely over the shoulders $c$ $c$, or rather the shoulders will freely pass over the plate, so that the plug turns independently of the candle; but when the plug is turned in the reverse direction the abrupt faces of the shoulders strike the plate and prevent the plug from turning farther backward without turning the candle with it or causing the plate to turn in the candle. The resistance offered to either of such movements is sufficient to keep the plug from becoming loosened by anything but such direct force as is applied to it when it is desired to remove it from the tube to put in a fresh candle.

The device just described is a suitable one for the purpose; but this feature of my invention is not restricted to any particular form and arrangement of device interposed between the plug and candle for accomplishing this end.

This lubricating device, as above described, may be manufactured and sold separately from the pulleys and be applied to the latter either before or after they have been put in use. In Fig. 4, however, I have shown the lubricating device formed in the pulley, the lubricant-receptacle being contained in one of the arms or spokes of the pulley. A modified form of plug or follower is also shown in this figure, the object of which is to avoid the necessity of screw-threading the interior of the receptacle its entire length. It will be seen that this form of plug will not permit as long a candle to be used in a pulley of given size as will the construction shown in Fig. 1.

In Figs. 5, 6, and 7 I have illustrated a modified form of receptacle, in which the interior is left smooth and the screw-plug dispensed with. The outer end of the tube is closed by a cap secured therein by a bayonet-lock, and between this cap and a follower D is interposed a spiral spring E. This spring will cause the follower to constantly press the candle inserted in the tube against the shaft. This form of receptacle and follower may be substituted for that in Fig. 4, as well as for the separate tube and follower of Fig. 1.

In Fig. 8 I have shown the application of my invention to a vehicle-wheel, a spoke containing the lubricant-receptacle, as does the arm of the pulley in Fig. 4, the tire having a hole in it coincident with the mouth of the receptacle. In this case I provide a plug for closing the mouth of the receptacle to keep out dirt in addition to the follower-plug. The outer plug has a squared head, which when the dirt becomes packed around it in the hole in the tire will prevent the plug from turning and becoming loosened.

It will be understood that in Fig. 8 the lubricant-receptacle is a separate metal tube inserted in a bore in the spoke.

I am aware that loose pulleys have heretofore been provided with radial lubricant-receptacles extending through the rim of the pulley and communicating with orifices extending through the hub of the pulley into the shaft-opening, their outer ends being closed by screw-plugs; but these receptacles have been designed to contain liquid lubricants and resemble my invention only in the fact that they form passages which extend radially from the shaft, opening to and through the rim of the pulley. The oil-receptacles were not of the same interior size throughout their length and were not adapted to receive a stick of solid lubricant and permit it to be pressed directly against the shaft, nor could the screw-plugs which closed their outer ends be made to act as followers to press a stick of solid lubricant against the shaft as it was gradually consumed.

I am also aware that it is not new to apply to loose pulleys lubricant-receptacles containing solid lubricants, such as grease candles, nor to provide such receptacles with followers to press the candles against the shaft, substantially as shown in Fig. 5; but these devices have heretofore been applied to the hub of the pulley near one of its ends, and their outer ends did not extend to or through the rim, the latter having no hole in it coincident with the receptacle, as in my case. In these old devices if the receptacles were not entirely outside of the vertical planes of the rim of the pulley they had to be made relatively short to permit the candles to be inserted, even piece by piece, in their outer ends. Under my construction and arrangement of the parts a candle of nearly the same length as the receptacle may be inserted, and it bears against the shaft near the middle of the hub instead of near one end, which is a material advantage. As combined with a pulley, therefore, the novel feature of my invention consists in a tubular receptacle of substantially the same interior size throughout its length to adapt it to receive and fit a stick of solid lubricant, opening at its inner end into the shaft-opening in the hub of the pulley and extending at its outer end in proximity to or through the rim of the pulley, the latter being provided with a hole coincident with the receptacle for the insertion of the candle, and the receptacle being provided with a follower to press the candle inward against the shaft.

As a new article of manufacture, independently of its combination with the pulley, my improved lubricating device consists of a tubular receptacle of substantially the same bore throughout its length, interiorly threaded the whole or a considerable part of its length, exteriorly threaded at one end, and provided with an interiorly-screw-threaded plug or follower adapted to be moved through a considerable portion of its length to follow up the lubricant as it is consumed.

Having thus fully described my invention, I claim—

1. As a new article of manufacture, the lubricating device for loose pulleys and wheels, consisting of a tubular receptacle of substantially the same bore throughout its length to adapt it to receive at one end and deliver from its other end a stick of solid lubricant snugly fitting within it and interiorly threaded a considerable portion of its length, exteriorly threaded at one end, and containing an exteriorly-threaded follower provided on its upper side with a nick for a screw-driver, whereby said follower may be screwed inward through the tube to press the lubricant against the shaft, substantially as and for the purpose described.

2. As a new article of manufacture, a lubricating device for loose pulleys and wheels, consisting of a tubular receptacle of substantially the same bore throughout its length to adapt it to receive a stick of solid lubricant, interiorly threaded a considerable portion of its length, exteriorly threaded at one end, and containing a screw-plug or follower carrying on its under side a projection and adapted to become embedded in the stick of lubricant, said projection being revoluble independently of the follower in one direction and the follower being provided with means to prevent such revolution of the projection in the opposite direction, substantially as and for the purpose described.

EDMUND LUNKENHEIMER.

Witnesses:
EDWARD RECTOR,
G. S. WENTWORTH.